US009554503B2

United States Patent
Noer et al.

(10) Patent No.: US 9,554,503 B2
(45) Date of Patent: Jan. 31, 2017

(54) SEED DISPENSER AND CONVEYANCE SYSTEM FOR AGRICULTURAL MACHINERY

(71) Applicants: Miguel Humberto Noer, Cruz Alta (BR); Marcio Luiz Neuwland Silva, Cruz Alta (BR)

(72) Inventors: Miguel Humberto Noer, Cruz Alta (BR); Marcio Luis Neuvald Silva, Cruz Alta (BR)

( * ) Notice: Subject to any disclaimer, the term of this patent is extended or adjusted under 35 U.S.C. 154(b) by 0 days.

(21) Appl. No.: 14/894,174

(22) PCT Filed: May 23, 2014

(86) PCT No.: PCT/BR2014/000172
§ 371 (c)(1),
(2) Date: Nov. 25, 2015

(87) PCT Pub. No.: WO2015/168759
PCT Pub. Date: Nov. 12, 2015

(65) Prior Publication Data
US 2016/0100519 A1    Apr. 14, 2016

(30) Foreign Application Priority Data
May 7, 2014 (BR) .................... BR1020140109498

(51) Int. Cl.
| *A01C 7/16* | (2006.01) |
| *A01C 7/08* | (2006.01) |
| *A01C 7/20* | (2006.01) |
| *A01C 7/04* | (2006.01) |

(52) U.S. Cl.
CPC .............. *A01C 7/16* (2013.01); *A01C 7/081* (2013.01); *A01C 7/20* (2013.01); *A01C 7/206* (2013.01); *A01C 7/046* (2013.01)

(58) Field of Classification Search
CPC ............. A01C 7/16; A01C 7/08; A01C 7/208; A01C 7/14; A01C 7/128; A01C 7/127; A01C 7/126; A01C 7/125; A01C 7/123; A01C 7/12; A01C 7/10; A01C 7/081; A01C 7/206; A01C 7/20; A01C 7/046
See application file for complete search history.

(56) References Cited

U.S. PATENT DOCUMENTS

| 2003/0159631 A1 | 8/2003 | Sauder et al. |
| 2004/0134399 A1 | 7/2004 | Stephens et al. |
| 2012/0111248 A1 | 5/2012 | Dillman |

*Primary Examiner* — Christopher J Novosad
(74) *Attorney, Agent, or Firm* — Hodgson Russ LLP (57) ABSTRACT

A seed dispenser and conveyor system applied in agricultural tools with a circular structural base (20) equipped with lid (22), and an angled vertical base (21) equipped with lid (23), on the upper part of the base (20) presenting a seed box (30), a vacuum turbine (40) and a cutting disk (50), with the system actuated by a bar (223) and gear (222) rotating the selector disk (VI) in a clockwise movement, transmitting the movement to the hollowed gears (B1, C1, D1, and E1) equipped with spacing that conveys the seed (60) to the releasing ramp (211), producing synchronized movements in opposed directions, uniformly conveying the seeds and not being subject to trepidation in the seeding line or any type of lateral, frontal and rear inclination, besides keeping the correct distance up to the seeding groove, and reducing the seed variation coefficient in the seeding line.

6 Claims, 12 Drawing Sheets

Corte A

SEED DISPENSER AND CONVEYANCE SYSTEM FOR AGRICULTURAL MACHINERY

FIELD OF THE INVENTION

The present invention describes a seed dispenser and conveyor system for agricultural tools.

More specifically, it comprises a system of hollowed gears with curved, square, oblique or rectangular positioners between its spacing openings, which house the seeds from the selector system to the seeding grooves, producing synchronized movements in opposite directions uniformly conveying the seeds, not being subject to trepidation in the seeding line as well any type of lateral, frontal or rear inclination, besides keeping the correct distance until the seeding grooves, reducing the seed variation coefficient in the seeding line.

BACKGROUND OF THE INVENTION

In the seeds cultivation, it is well known that seed quality and distribution in the soil are essential for a good performance.

It is estimated that, for each failure percentage in the planting (dig with no seed), or for each percentage of "double" seeding (two seeds per dig) there is a 3.3% loss in productivity.

Furthermore, there is a greater loss due to irregular distancing of the seeds, i.e., the variation coefficient (VC) of the distancing between grains, providing a productivity loss from 1.5 to 3 bags per hectare for each 10% variation of the variation coefficient (VC).

Nowadays, seeders for planting comprise a seed conveyor tube from the selector system to the seeding groove.

The seed is transported from the conveyor tube to the internal part of the system, free falling from an average height of seven hundred millimeters until the seeding groove, this system, besides generating uneven distribution and high variation coefficient due to the disorderly fall of seeds, it does not have any regulation device to control seeds deposition, and may also have sensors in the center of the conveyor tube that prevent the seed from sliding straightforwardly in the seeding grooves, resulting in an uneven deposition.

These systems operate with a variation of the variation coefficient (VC) from 30% to 80%, having a productivity loss from 4.5 to 25 bags per hectare.

Therefore, the object of the present invention is a seed dispenser and conveyor system applied in agricultural tools developed with a set of hollowed gears and curved, square, oblique or rectangular positioners between its spacing openings which, through synchronized counter-clockwise and clockwise movements, regulate the seeds fall in the seeding line, reducing the variation coefficient to almost zero, since it positions the seeds into the correct spaces minimizing the uneven distribution, eliminating bounce and contributing to the productivity per hectare improvement.

Furthermore, hollow gears do not allow clogging for being grooved or hollowed and cleaned by the scrapers or ejectors, being able to stand any ascending, descending or lateral movement of the seeder without affecting the system accuracy.

DETAILED DESCRIPTION OF THE INVENTION

Figure 1:
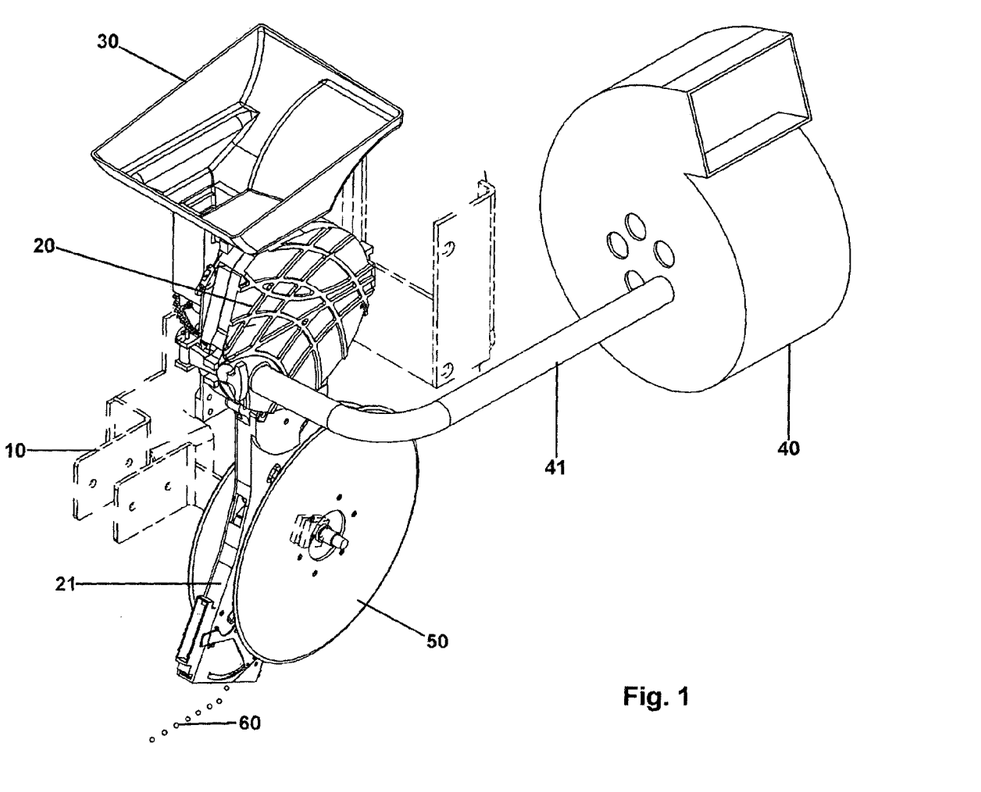
FIG. 1 shows the perspective frontal view of the seed dispenser and conveyor system applied in agricultural tools.
Figure 2:
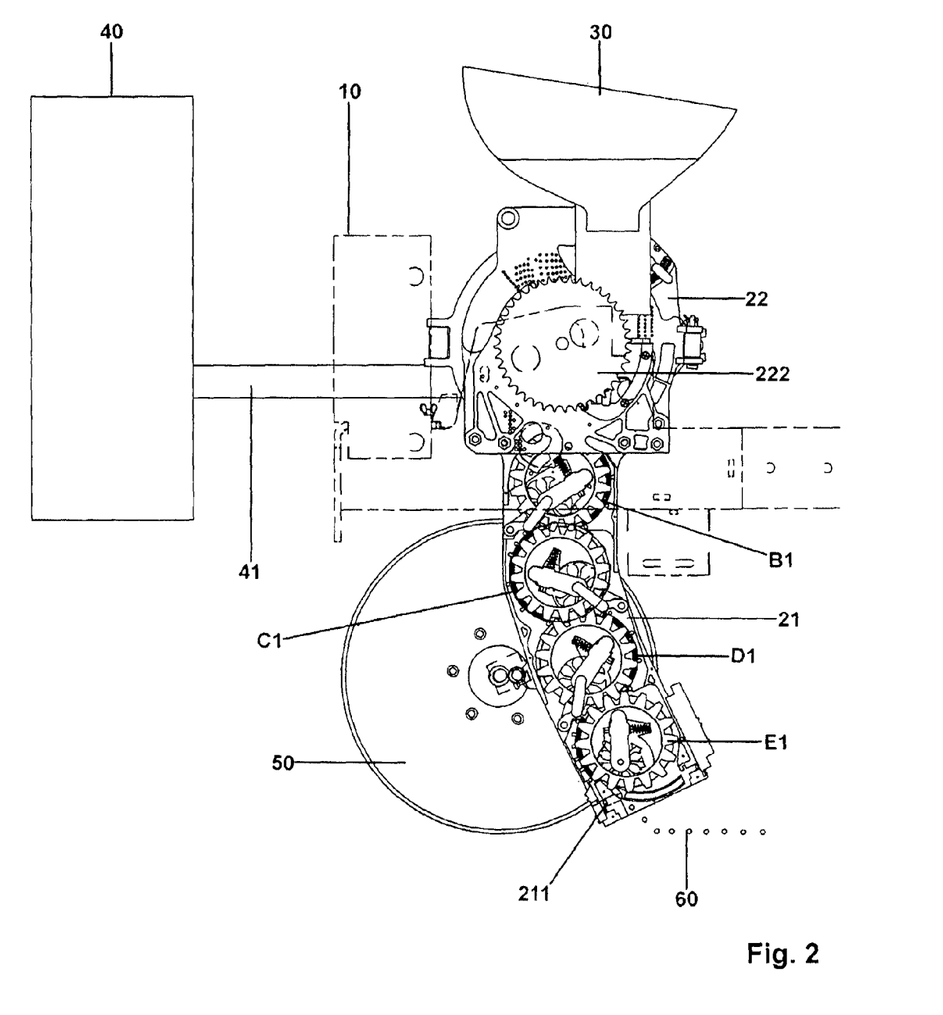
FIG. 2 shows the posterior view of the seed dispenser and conveyor system, showing disks and gears system.
Figure 3:
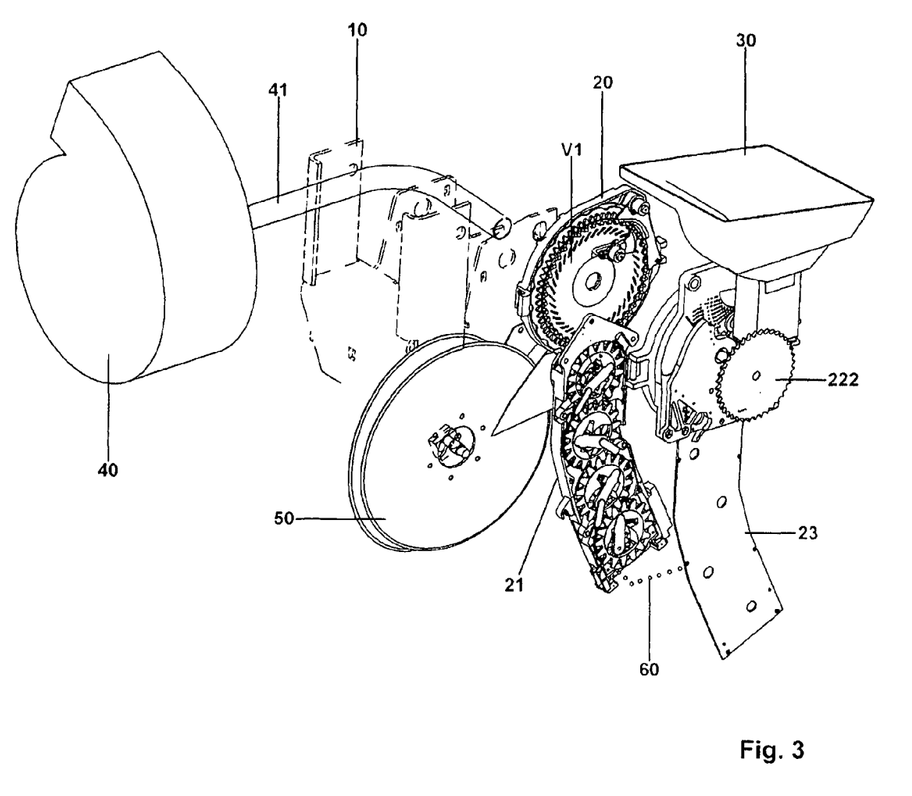
FIG. 3 shows the enlarged perspective posterior view of the system gears.
Figure 4:
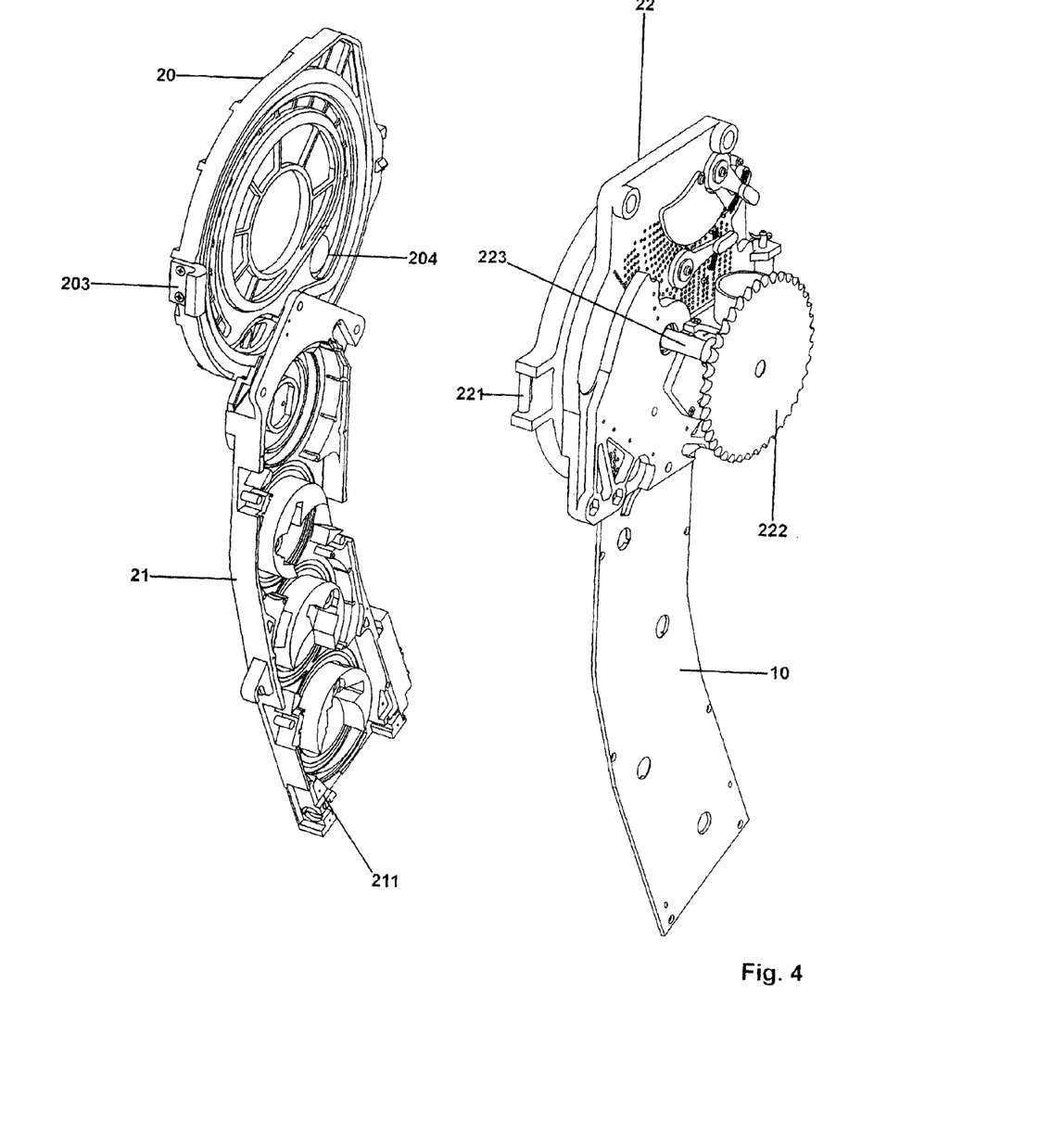
FIG. 4 shows in detail the circular structural base (20) and the angled vertical base (21) equipped with lid (22) and (23).

The seed dispenser and conveyor system for agricultural tools, object of the present invention, comprises a chassis (10) supporting the circular structural base (20) equipped with lid (22) and an angled vertical base (21) equipped with protection lid (23); said circular structural base (20) with lid (22) presents on its upper part a seed box (30), a vacuum turbine (40) that feeds and generates suction in the seed dispenser system through a pipe (41) connected with the circular base (20) and a cutting disk (50), uniformly distributing the seeds (60) in the soil.

Figure 5:
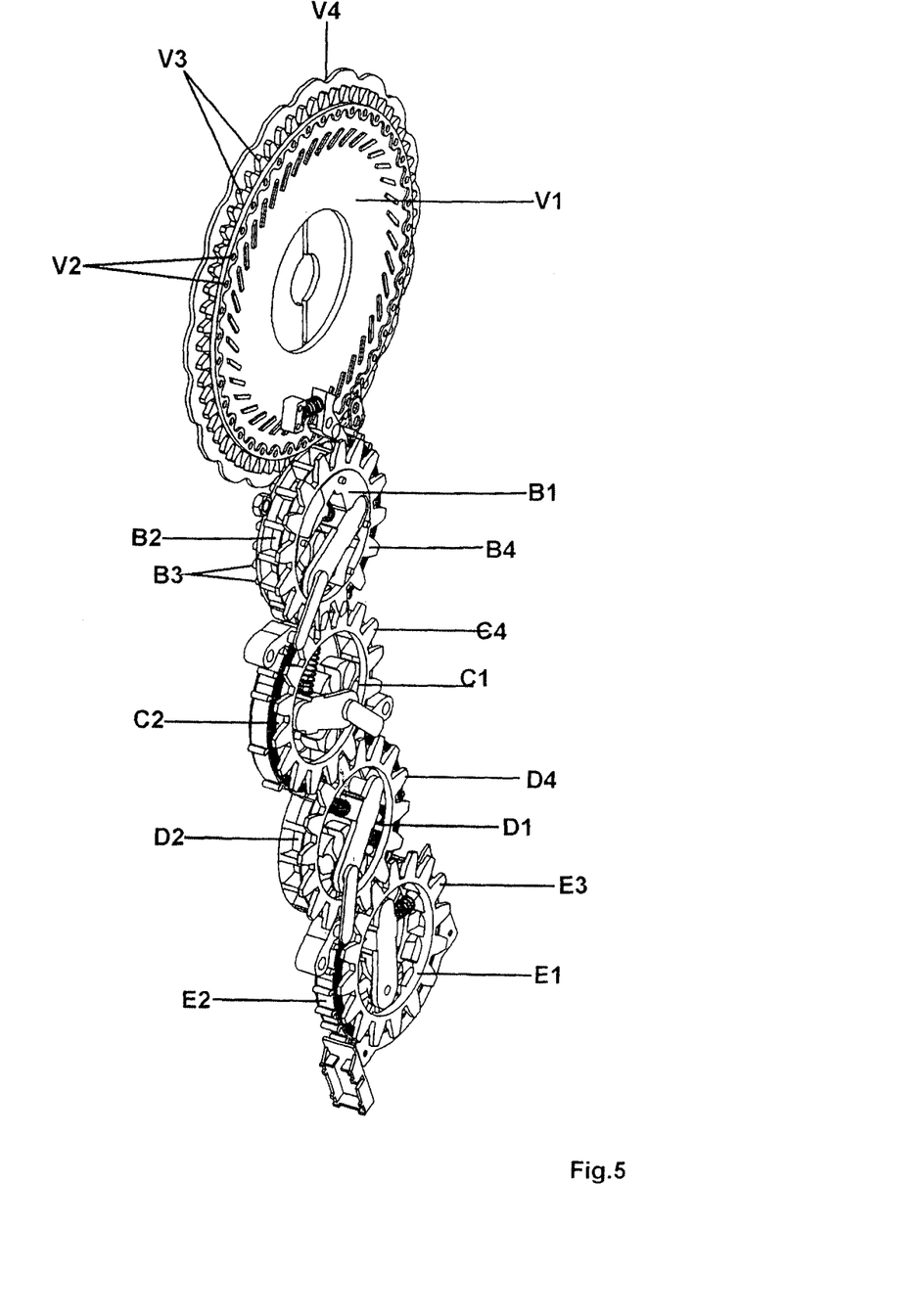
FIG. 5 shows in detail the selector disk (V1) and the set of hollowed disks (B1, C1, D1, and E1).

The circular structural base (20) has internally a selector disk (V1) with spaces (V2) that receive the seeds (60) from the seed box (30) and teeth (V3), which transmit the movement to the hollowed gears (B1).

Figure 11:
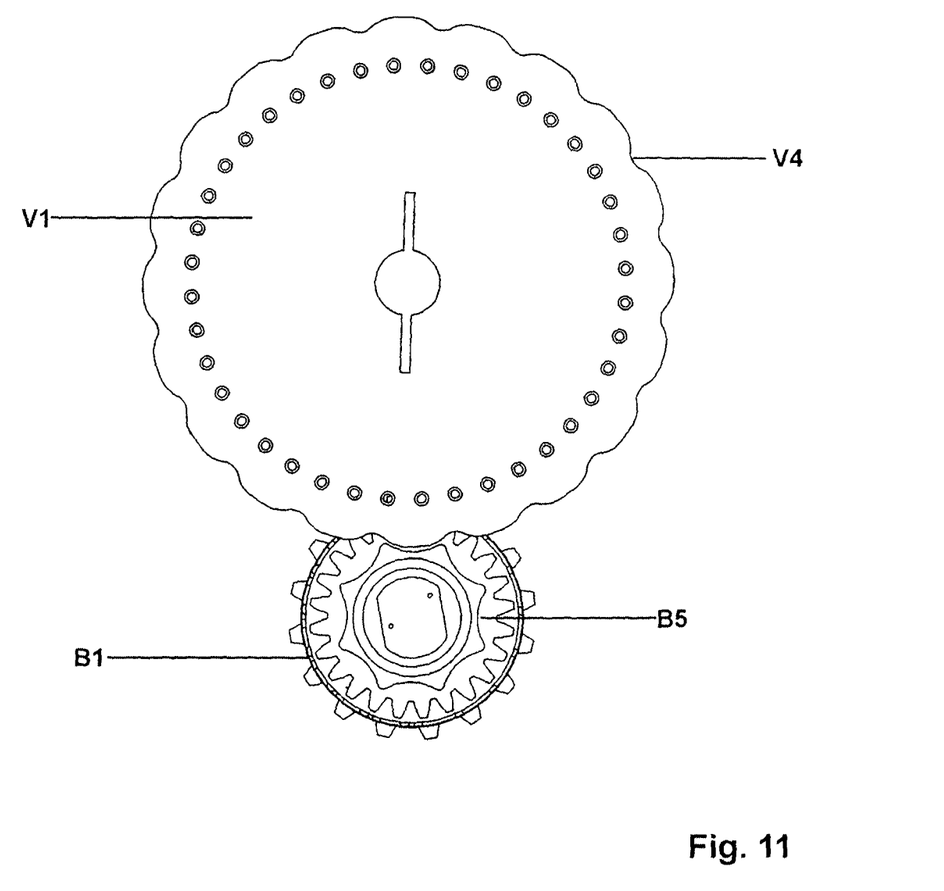
FIG. 11 shows a frontal view of the selector disk (V1) with wavy edges (V4) and the hollowed disk (B1) with wavy edges (B5).

The selector disk (V1) presents the wavy external edge (V4) fitting the wavy edge (B5) of the gear (B1), allowing the selector disk (V1) to fit into the correct spot of the gear (B1), ensuring the seeds (60) to be conveyed from the selector disk (V1) to the spacing (B2) along the gear (B1), maintaining the operation synchronism of the seed dispenser and conveyor system.

The angled vertical base (21) has internally a set of interconnected hollowed gears (B1, C1, D1, and E1) which direct the seeds (60) from the selector disk (V1) to the seeding groove together with the soil.

Figure 6:
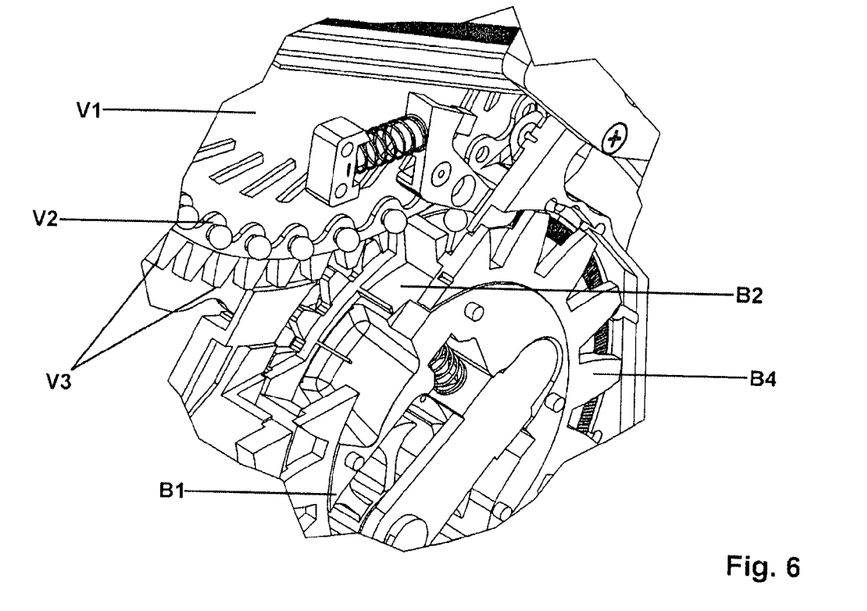
FIG. 6 shows in detail the selector disk (V1) with the hollowed disk (B1), and the FIG. 6A details the hollowed disk (E1) and releasing ramp (211).

The hollowed gear (B1) presents a spacing (B2) to receive the seeds from the selector disk (V1), a movement gear (B3) interconnected to the teeth (V3) arranged in the selector disk (V1), which enable the hollowed disk (B1) and the gear (B4) to move, transmitting the movement to the disk (C1).

The hollowed gear (B1) presents a wavy external edge (B5) fitting the wavy edge (V4) of the selector disk (V1), maintaining the operation synchronism of the seed dispenser and conveyor system.

The hollowed gear (C1) presents a spacing (C2) to receive the seeds from the hollowed gear (B1), a movement gear (C3) interconnected to the teeth (B4) arranged in the hollowed gear (B1), which enable the movement of the hollowed disk (C1) and the movement gear (C4), which transmits the movement to the gear (D1).

The hollowed gear (D1) presents a spacing (D2) to receive the seeds from the hollowed gear (C1), a movement gear (D3) interconnected to the teeth (C4) arranged in the hollowed gear (C1), which enable the movement of the hollowed gear (D1) and the movement gear (D4), which transmits the movement to the gear (E1).

Figure 6A:
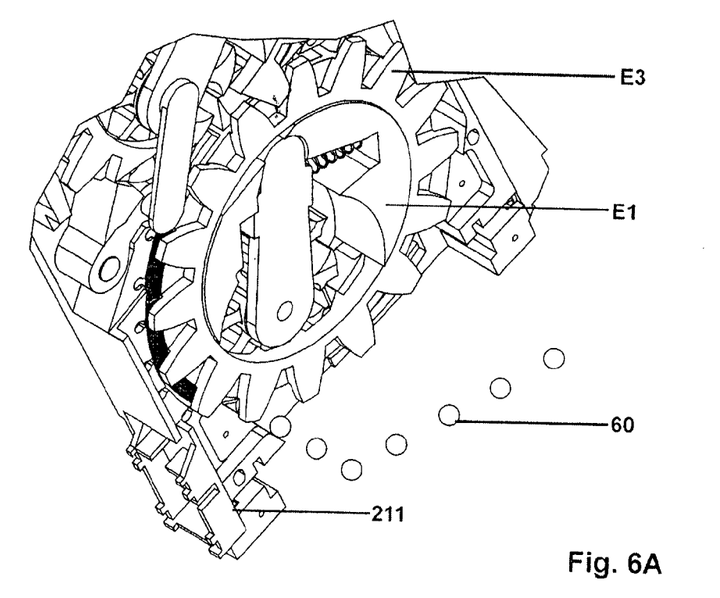

The hollowed gear (E1) presents a spacing (E2) to receive the seeds from the hollowed gear (D1), a movement gear (E3) interconnected to the teeth (D4) arranged in the hollowed gear (D1), which enable the movement of the hollowed gear (E1), directing the seeds (60) to the seeding groove.

Figures 7, 7A:
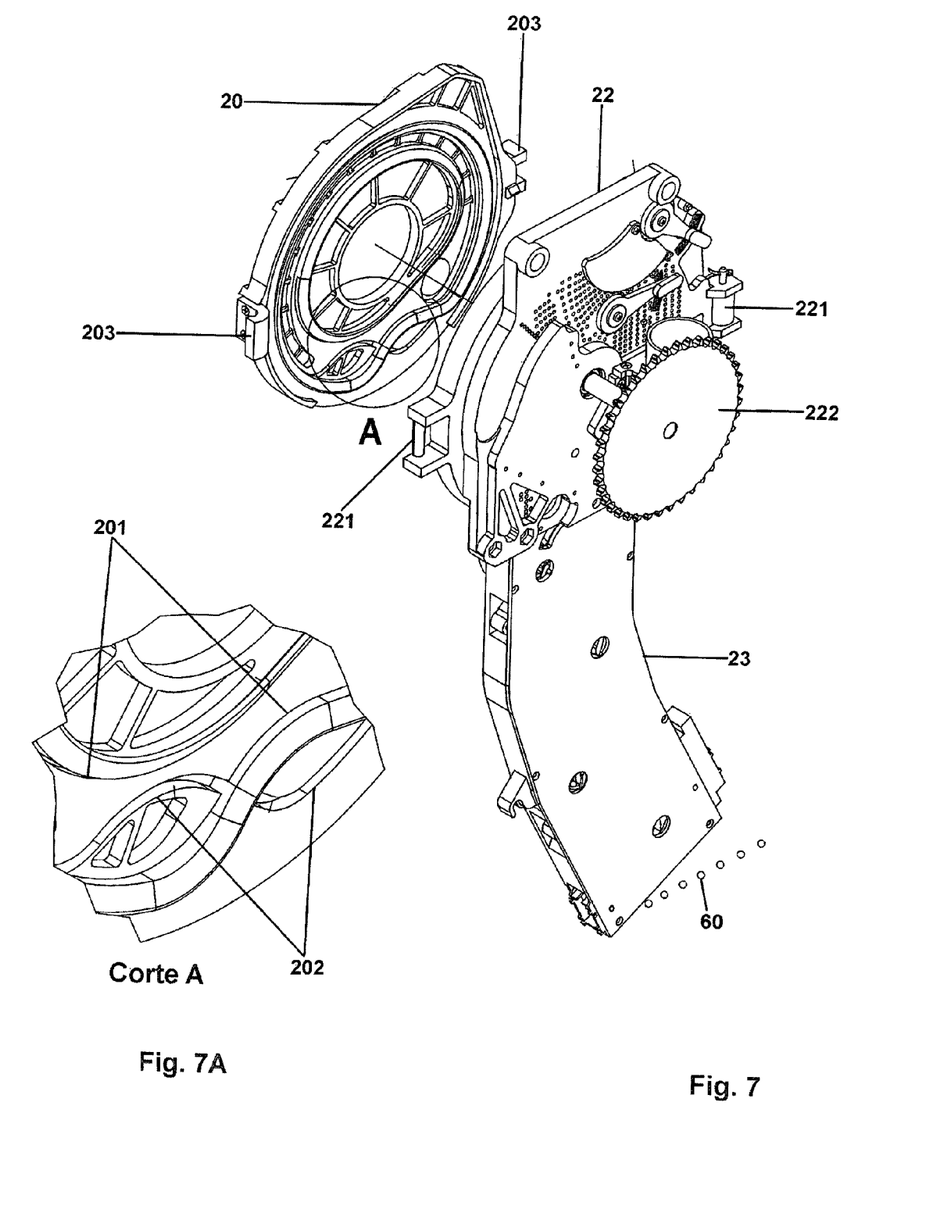
FIG. 7 shows the enlarged posterior view of the structural base (20) and lid (22)
FIG. 7A shows the vacuum sealing system.

The circular structural base (20) presents, in its internal structure, a pair of rubbers (201) equipped with a variable fitting system (202) that allows changing the seeds point of release for 6 hours.

Furthermore, it describes the protrusion (203) that fits the lid (22) allowing an easy fit, and on the front portion it presents a drill (204) of pipe fit (41) from the vacuum turbine (40).

The lid (22) is fitted into the circular structural base (20) through couplings (221), which are connected to the protrusions (203) of the base (20), on the posterior portion there is a traction gear (222) equipped with an activation bar (223) transmitting the movement to the selector disk (V1), providing movement and actuation of the entire system.

The seed dispenser and conveyor system is activated through the traction gear (222), which transmits the movement to the selector disk (V1) through an actuation bar (223) performing the clockwise movement of the disk (V1).

In the posterior portion of the circular structural base (20), the pipe (41) is coupled from the vacuum turbine (40), which generates vacuum suction inside the circular base (20) when coupled to the lid (22), being the vacuum generated between the pair of rubbers (201).

When the selector disk (V1) moves, it passes with its spacing (V2) between the pair of rubbers (201), positioning with the vacuum the seeds (60) from the seed box (30) in the spacing (V2) of the selector disk (V1), being the suction generated by the vacuum turbine (40) fixed to the seed (60) in the spacing (V2) of the selector disk (V1).

Figure 10:
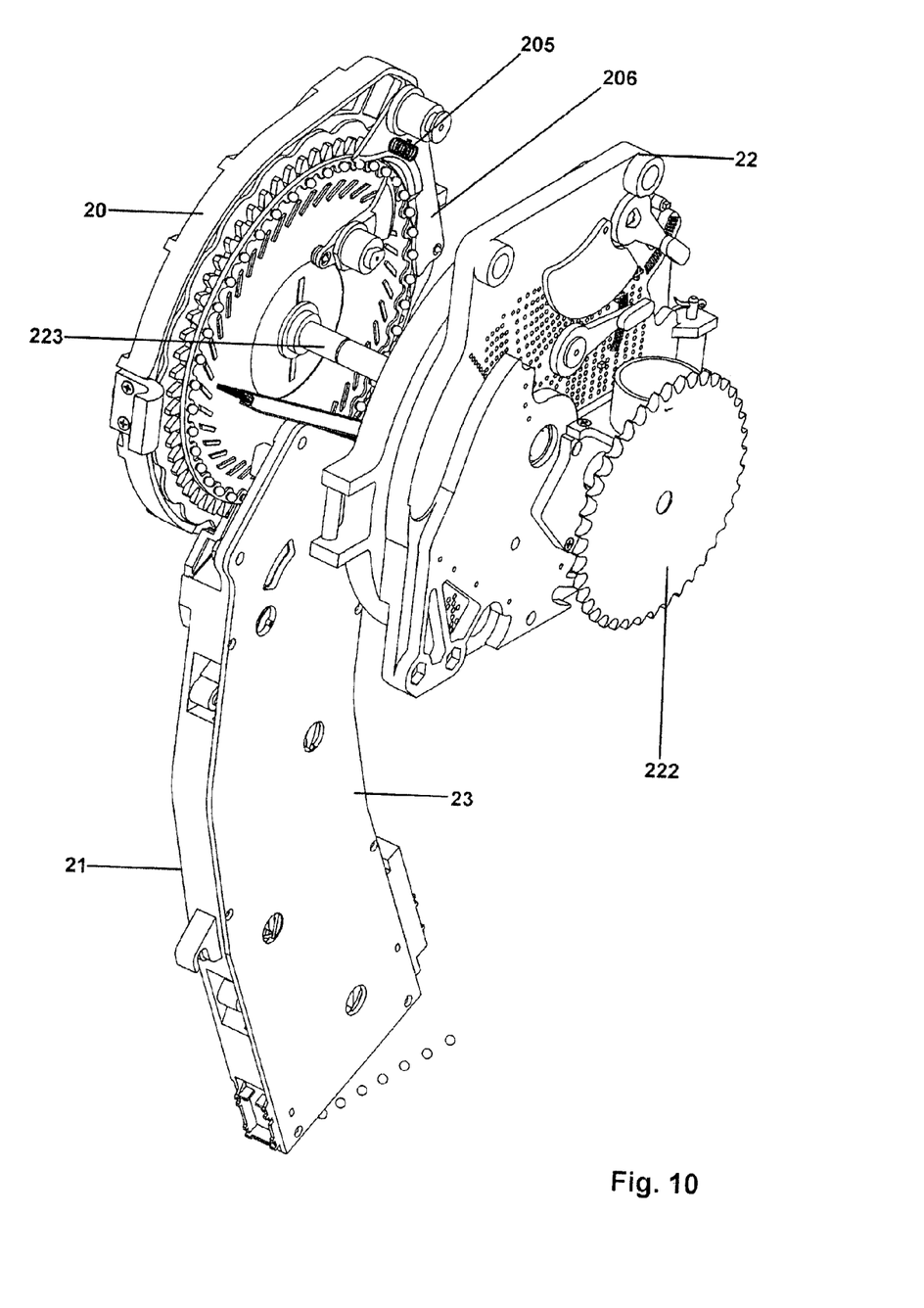
FIG. 10 shows the enlarged posterior view of the system, highlighting double seeds eliminators (205 and 206).

The system presents double seeds eliminators (205) and (206), arranged inside the base (2) releasing the seeds one by one in the spacing (B2) of the hollowed gear (B1), presenting the release position of 6 hours, as set through the variable fitting system (202).

The hollowed gear (B1), with a counter-clockwise movement receives the seeds (60) in its spacing (B2) and directs them to the hollowed gear (C1).

The disks (V1) and the gear (B1) present wavy edges (V4) and (B5), which allow the operation synchronism of the seed dispenser and conveyor system.

The hollowed gear (C1) moving in a clockwise direction, receives the seeds (60) in its spacing (C2) and directs them to the hollowed gear (D1).

The hollowed gear (D1) moving in a counter-clockwise direction, receives the seeds (60) in its spacing (D2) and directs them to the hollowed gear (E1).

The hollowed gear (E1) moving in a clockwise direction, receives the seeds (60) in its spacing (E2) and directs them to the releasing ramp (211), with approximately 50 mm of the seeding groove in the soil with uniform distancing and distribution.

The releasing ramp (211) presents a spring mechanism (212) to position the seeds, enabling the uniform release with the correct seeding space in the planting.

Figure 9:
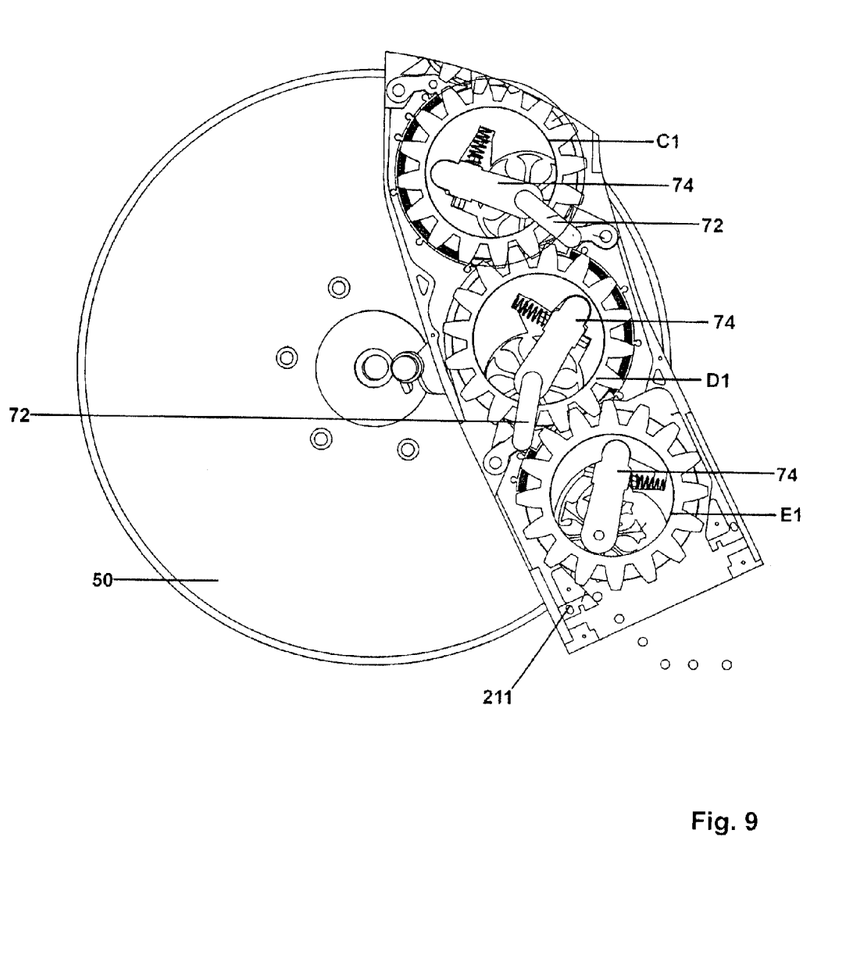
FIG. 9 shows in detail the ejection gears (70) and the dispenser system for agricultural tools.

The hollowed gears (B1, C1, D1, and E1) present ejection gears (70) in the internal part of each disk, being the ejection gears (70) fitted into the spacing (B2, C2, D2, and E2) of the gears (B1, C1, D1, and E1), preventing the seeds from remaining stuck and not being conveyed to the releasing ramp (211) with a spring (212).

Figure 8:
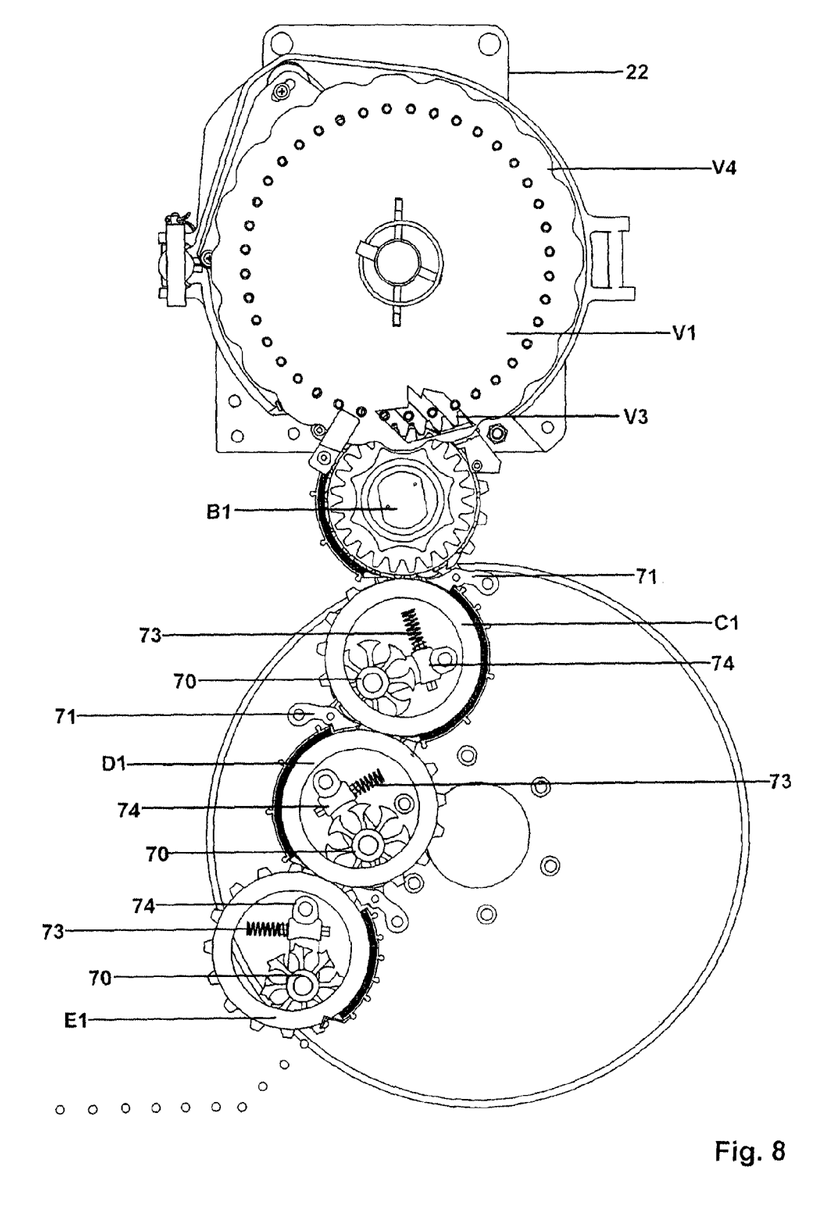
FIG. 8 shows the frontal view of the system with details of the coil (73) and ejection gears (70).

The seed guide (71) is coupled to the ejection gears (70), which remains connected to the gear (70) by the linking arm (72), both gear (70) and conveyor (71) are pressed to remain in their positions by the spring (73) and the ejection gear support (74), making all seeds being transferred from the hollowed gears (B1, C1, D1, and E1) to the releasing ramp (211).

Alternatively, the number of hollowed gears (B1, C1, D1, and E1) may be varied according to the need and space of the seeding machinery, and some gears may be added or removed, but they must be synchronized with the selector disk (V1).

Figure 12:
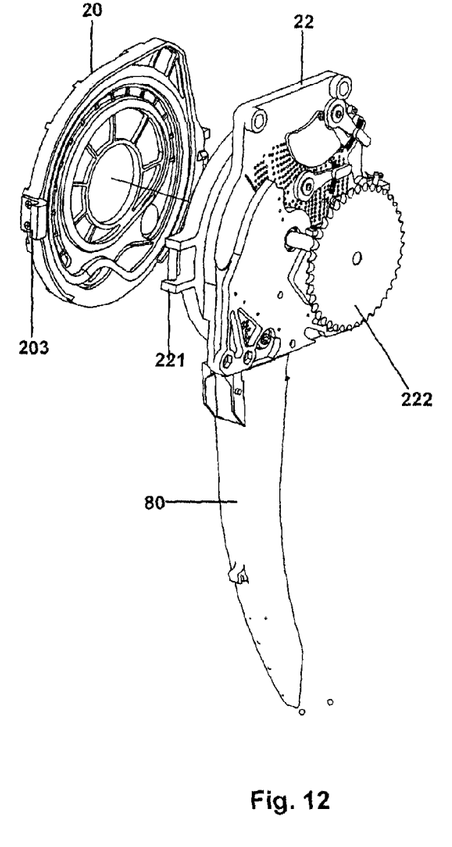
FIG. 12 shows a posterior view of the circular structural base (20) with the seed conveyor tube (80)
Figure 12A:
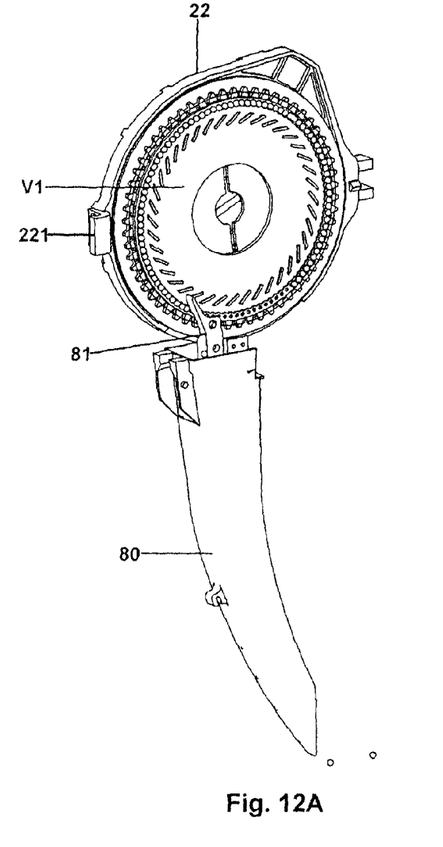
FIG. 12A presents a frontal view of the circular structural base (20) with the seed conveyor tube (80).

Alternatively, the seed dispenser and conveyor system allows the angled vertical base (21) equipped with hollowed gears (B1, C1, D1, and E1) to be replaced for a seed conveyor tube (80), coupled to the circular structural base (20) equipped with a selector disk (V1).

For this system operation, it is used a seed conveyor with self-adjustable pressure (81), allowing the seeds to be released in the very center of the conveyor tube (80).

In order to use this system, it is necessary to adjust the variable fitting system (202) arranged near the rubbers (201) of the circular base (20), adjusting the vacuum cut within 5 hours, reducing the freefall height of the seeds in approximately 150 mm to the soil, with less rebound and a better seed distribution, according to the descriptions of FIGS. 12 and 12A.

The invention claimed is:

1. A seed dispenser and conveyor system applied to agricultural tools, comprising:
    a chassis (10) supporting a circular structural base (20) including a lid (22) and an angled vertical base (21) including a lid (23),
    a vacuum turbine (40) in an upper part of the circular structural base (20), wherein the vacuum turbine includes pipes (41) coupled to a fit hole (204) of the circular structural base (20),
    a seed box (30) in an upper part of the circular structural base (20),
    a cutting disk (50),
    a bar (223),
    a gear (222),
    a selector disk (V1) defining spacing (V2), movement transmission teeth (V3), and a wavy external edge (V4),
    a first hollowed gear (B1) defining spacing (B2), gear (B3), movement gear (B4), and wavy external edge (B5),
    a second hollowed gear (C1) defining spacing (C2), gear (C3), and movement transmission gear (C4),
    a third hollowed gear (D1) defining spacing (D2), gear (D3), and movement transmission gear (D4),
    a fourth hollowed gear (E1) defining spacing (E2) and movement gear (E3),
    a releasing ramp (211), and
    a pair of rubbers (201), wherein the seed dispenser and conveyor system is configured to be actuated by the bar (223) and the gear (222) rotating in a clockwise movement, wherein the selector disk (V1) transmits the movement to the first hollowed gear (B1), which moves in a counter-clockwise movement with the selector disk (V1), wherein the first hollowed gear (B1) transmits the movement to the second hollowed gear (C1), which moves in a clockwise movement, wherein the second hollowed gear (C1) transmits the movement to the third hollowed gear (D1), which moves in a counter-clockwise movement, wherein the third hollowed gear (D1) transmits the movement to the fourth hollowed gear (E1), which moves in a clockwise movement, wherein the selector disk (V1), the first hollowed gear (B1), the second hollowed gear (C1), the third hollowed gear (D1), and the fourth hollowed gear (E1) are configured to forward seeds (60) to the releasing ramp (211), wherein the vacuum turbine (40) is configured to generate vacuum suction inside the circular structural base (20) when coupled to the lid (22), and wherein vacuum generated between the pair of rubbers (201) is configured to attach the seeds (60) into the spacing (V2) of the selector disk (V1).

2. The seed dispenser and conveyor system applied to agricultural tools, according to claim 1, further comprising ejection gears (70) inside each of the hollowed gears (B1, C1, D1, and E1), wherein the ejection gears (70) fit into the spacing (B2, C2, D2 and E2) of the respective hollowed gears (B1, C1, D1, and E1), thereby preventing the seeds from remaining stuck and not being forwarded to the releasing ramp (211).

3. The seed dispenser and conveyor system applied to agricultural tools, according to claim 1, further comprising a spring mechanism (212) for seed (60) positioning connected with the releasing ramp (211), allowing for release upon seeding with uniform distancing and distribution.

4. The seed dispenser and conveyor system applied to agricultural tools, according to claim 1, wherein the pair of rubbers (201) inside the structural base (20), are equipped with a variable fitting system (202) that allows changing a release point of the seeds (60) for 5 or 6 hours.

5. The seed dispenser and conveyor system applied to agricultural tools, according to claim 1, further comprising at least one additional hollowed gear synchronized with the selector disk (V1).

6. A seed dispenser and conveyor system applied to agricultural tools, comprising:

a chassis (10) supporting a circular structural base (20) including a lid (22), a vacuum turbine (40) in an upper part of the circular structural base (20), wherein the vacuum turbine includes pipes (41) coupled to a fit hole (204) of the circular structural base (20), a seed box (30) in an upper part of the circular structural base (20), a cutting disk (50), a bar (223), a gear (222), a selector disk (V1) defining spacing (V2), movement transmission teeth (V3) and a wavy external edge (V4), a seed conveyor tube 80 with a seed guiding system with self-adjustable pressure (81), a releasing ramp (211), and a pair of rubbers (201), wherein the seed dispenser and conveyance system is configured to be actuated by the bar (223) and the gear (222) rotating in a clockwise movement, wherein the seed conveyor tube 80 with the seed guiding system with self-adjustable pressure (81) is configured to adjust the vacuum cut in 5 hours together with the pair of rubbers (201), wherein the vacuum turbine (40) is configured to generate vacuum suction inside the circular structural base (20) when coupled to the lid (22), and wherein vacuum generated between the pair of rubbers (201) is configured to attach the seeds (60) into the spacing (V2) of the selector disk (V1).

* * * * *

UNITED STATES PATENT AND TRADEMARK OFFICE
CERTIFICATE OF CORRECTION

PATENT NO. : 9,554,503 B2  
APPLICATION NO. : 14/894174  
DATED : January 31, 2017  
INVENTOR(S) : Noer et al.

It is certified that error appears in the above-identified patent and that said Letters Patent is hereby corrected as shown below:

On the Title Page

Item (71) should read:  
--(71) Applicants: Miguel Humberto Noer, Cruz Alta  
(BR); Marcio Luis Neuvald Silva,  
Cruz Alta (BR)--

Signed and Sealed this  
Fifteenth Day of August, 2017

Joseph Matal  
*Performing the Functions and Duties of the*  
*Under Secretary of Commerce for Intellectual Property and*  
*Director of the United States Patent and Trademark Office*